Aug. 25, 1931.  C. T. PFLUEGER  1,820,887

FISHHOOK

Filed Oct. 10, 1925

INVENTOR.
CHARLES T. PFLUEGER.
BY
ATTORNEY.

Patented Aug. 25, 1931

1,820,887

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHHOOK

Original application filed June 19, 1924, Serial No. 720,902. Divided and this application filed October 10, 1925. Serial No. 61,709.

The present invention relates to fish hooks and is a division of my prior application Serial Number 720,902, filed June 19, 1924.

The object of the present invention is to provide improved means for retaining bait in proper position on a hook, which is especially effective when used with pork rind or similar bait, the device operating to keep the bait in substantially parallel relationship to the shank of the hook, so that it is substantially flat at all times.

One form of the invention is shown in the drawings, but it will be appreciated that other embodiments thereof may be designed which come within the scope of the invention as set forth in the claims.

Figure 3:
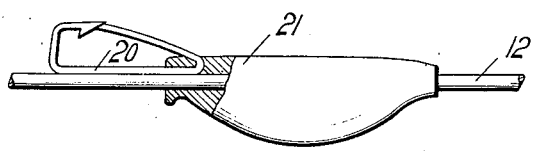
Figure 3 shows a slightly modified device for securing the bait hook in position.

In the drawings, 10 designates the hook as a whole, 11 the eye, 12 the shank, 13 the curved or bent portion of the hook, and 14 the barb or prong. Formed upon the shank 12 is a weight 15 of lead or the like, in which is secured a device for retaining the upper end of the bait. This comprises a secondary hook or prong 16, the body 17 of which is placed alongside the shank and embedded within the body of the weight 15. The body 17 is reversely bent to form a weed guard 18 which overlies the point of the hook. The invention may be modified in this detail as shown in Figure 3, in which the bait retaining device is indicated at 20, being embedded at its upper end only in the weight 21.

At substantially the point where the straight or shank portion of the hook merges into the curved portion 13, there is provided a suitable stop device or retainer for the pork rind or other bait 22. In the form of the invention illustrated herein, there are provided two spaced stops 24—24. When the bait is to be applied to the hook, its central portion is passed over the pointed end of the hook and over the outer stop 24, and its upper end is then fastened upon the hook 16. This device holds the pork rind in proper position and it is caused to lie along the hook, the stops preventing it from traveling to either side and insuring that the tail of the pork rind will always extend to the rear of the hook.

The hook or prong which constitutes the holder for the upper end of the bait projects perpendicularly or substantially perpendicularly from the shank of the hook. When the pork rind is applied the central or middle portion is first passed over the hook and against the innermost or lower stop 24. The upper end is then passed over the prong 16. This arrangement makes it possible to have that portion of the pork rind between the stop 24 and the prong 16 under tension so that it lies against the shank of the hook and is thus prevented from bending or curling, thereby assisting in maintaining the end of the rind in a trailing position. The position of the rind against the shank of the hook prevents it from wrapping around the point of the hook and thereby interfering with the operation of the hook.

Figure 1:
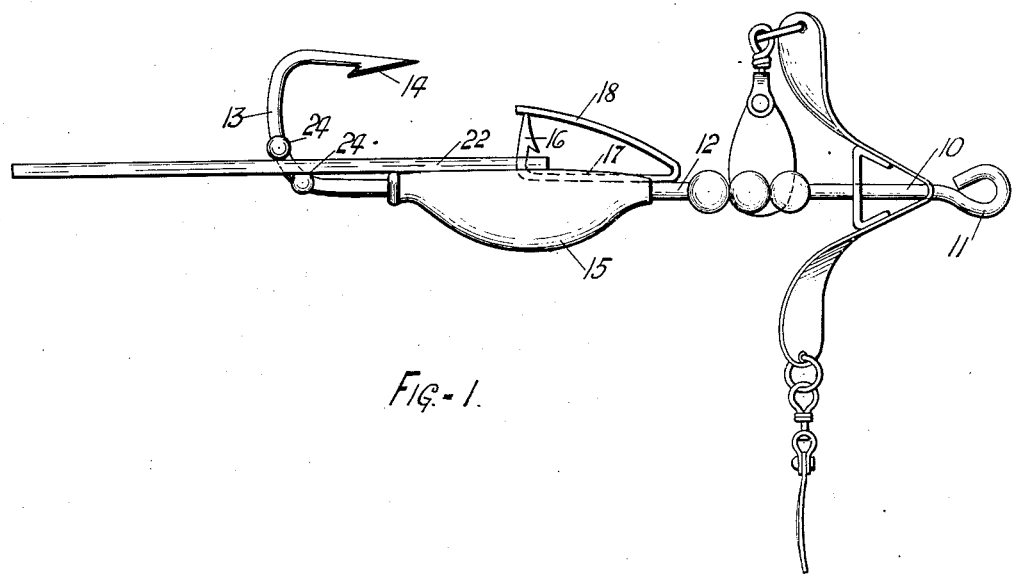
Figure 1 is an enlarged side elevation of a fish hook provided with the feature constituting the present invention, without a buck tail in place.
Figure 2:
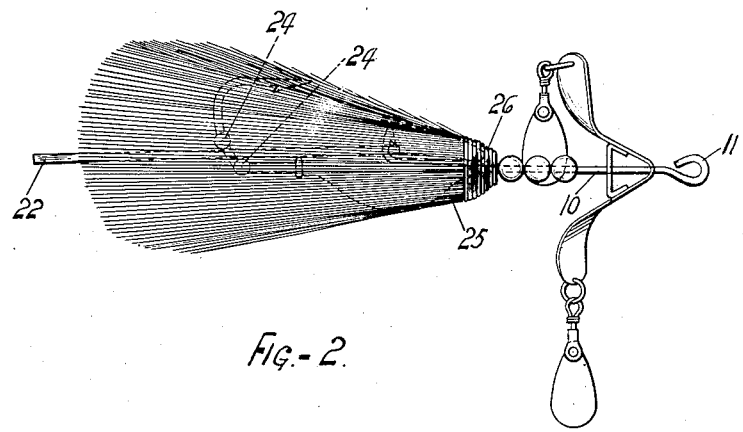
Figure 2 is a similar view showing the device with a buck tail.

Figure 2 shows the complete device assembled with its buck tail 25, which is secured by being wrapped at 26 over the upper end of the bait retaining hook.

It is obvious that the invention is not limited to the provision of the two stops 24 upon the hook as other means may be devised as substitutes for these stops, but such devices are intended to be covered in the claims hereto appended, for, as far as known to me, this is the first device of its kind in which provision has been made for maintaining the central portion of a pork rind or similar bait in parallelism with the shank of a fish hook by the expedient of engaging it at its upper portion along the shank of the hook and providing a stop upon the hook at the end of the shank to engage the central portion of the bait.

What is claimed is:

1. In a device of the kind described, a hook having a straight shank and a prong, a second prong extending substantially perpendicularly from the shank, and a stop on the hook, said second prong and stop being so arranged on the hook as to be adapted to cooperate to hold the bait against the shank of the hook.

2. In a device of the kind described, the combination of a fish hook having a shank, an enlargement upon the hook, a projection extending from the hook and located above the enlargement, the projection comprising a bait holding portion fixed substantially perpendicular to the shank of the hook, and a pork rind having its upper portion held under tension between the projection and the enlargement.

3. In a device of the kind described, the combination of a fish hook having a shank, an enlargement upon the hook, a projection extending from the hook and located above the enlargement, the projection having a bait holding portion substantially perpendicular to the shank of the hook, and a pork rind having its upper portion held in parallelism to the shank of the hook between the projection and the enlargement.

4. In a device of the kind described, the combination with a fish hook having a shank, a weight located upon the shank, an enlargement upon the shank between the weight and the curved portion of the hook, a fixed bait holding projection extending perpendicularly from the weight, and a pork rind, the upper end of which is attached or the projection and the central portion of which is pierced by the hook and rests against the projection.

5. In a device of the kind described, the combination with a fish hook having a shank, of a weight located upon the shank, a stop on the hook below the weight, and a bait holding projection extending from the weight and substantially perpendicular to the shank.

6. In a device of the kind described, the combination with a fish hook having a shank, a stop on the shank of the hook, and a projection on the shank of the hook, said projection having a bait holding portion extending substantially perpendicularly to the shank, the said stop and projection being fixed but adapted to hold a pork rind or the like under tension originally applied by the fingers.

7. In a device of the kind described, the combination with a fish hook having a shank, a stop on the shank of the hook, and a projection located above the stop and having a rigid bait holding portion extending substantially perpendicularly to the shank of the hook.

CHARLES T. PFLUEGER.